(12) United States Patent
Benco et al.

(10) Patent No.: US 12,222,310 B2
(45) Date of Patent: *Feb. 11, 2025

(54) MAGNESIUM ION SELECTIVE MEMBRANES

(71) Applicant: Siemens Healthcare Diagnostics Inc., Tarrytown, NY (US)

(72) Inventors: John Benco, Holliston, MA (US); Robert Bergquist, Middleboro, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,011

(22) Filed: Oct. 10, 2023

(65) Prior Publication Data

US 2024/0068984 A1   Feb. 29, 2024

Related U.S. Application Data

(60) Continuation of application No. 17/174,482, filed on Feb. 12, 2021, now Pat. No. 11,821,867, which is a division of application No. 15/547,951, filed on Aug. 1, 2017, now abandoned, which is a continuation of application No. PCT/US2016/015929, filed on Feb. 1, 2016.

(60) Provisional application No. 62/239,492, filed on Oct. 9, 2015, provisional application No. 62/111,293, filed on Feb. 3, 2015.

(51) Int. Cl.
*G01N 27/333* (2006.01)
(52) U.S. Cl.
CPC ............... *G01N 27/3335* (2013.01)

(58) Field of Classification Search
CPC .................................................. G01N 27/3335
See application file for complete search history.

(56) References Cited

U.S. PATENT DOCUMENTS

| 4,519,891 A | 5/1985 | Sugahara |
| 4,713,165 A | 12/1987 | Conover |
| 4,871,439 A | 10/1989 | Enzer |
| 5,102,527 A | 4/1992 | Shibata |
| 5,305,518 A | 4/1994 | Okumoto |
| 5,312,986 A | 5/1994 | Simon et al. |

(Continued)

FOREIGN PATENT DOCUMENTS

| CA | 2072311 A1 | 12/1992 |
| CA | 2319071 A1 | 8/1999 |

(Continued)

OTHER PUBLICATIONS

John Edsall-Boston, "The plasma proteins and their fractionation," Reviews of Physiology, Biochemistry and Pharmacology, 46, 308-353 (1950) (Year: 1950).

(Continued)

*Primary Examiner* — Alexander S Noguerola

(57) ABSTRACT

The present invention is directed to membranes, sensors, systems and process for the detection of magnesium ions in protein-containing samples. The novel membranes, sensors, systems, and processes are based upon the discovery that the lipophilicity of the plasticizer (or blend of plasticizers) utilized in the formulation of magnesium ion selective membranes for clinical use is inversely proportional to the sensitivity of the plasticizer(s) and directly proportional to the use life thereof.

19 Claims, 1 Drawing Sheet

(56) References Cited

U.S. PATENT DOCUMENTS

| | | | |
|---|---|---|---|
| 5,336,388 | A | 8/1994 | Leader et al. |
| 5,350,518 | A | 9/1994 | Hiti et al. |
| 6,143,558 | A | 11/2000 | Kopelman et al. |
| 6,409,909 | B1 | 6/2002 | Spichiger-Keller et al. |
| 6,767,450 | B2 | 7/2004 | Terashima et al. |
| 7,384,523 | B2 | 6/2008 | Samproni |
| 2002/0155600 | A1 | 10/2002 | Kopelman et al. |
| 2004/0256227 | A1 | 12/2004 | Shin et al. |
| 2006/0060471 | A1 | 3/2006 | Murphy et al. |
| 2011/0139638 | A1 | 6/2011 | Zhang et al. |
| 2012/0197231 | A1 | 8/2012 | Kane et al. |
| 2014/0158536 | A1 | 6/2014 | Thompson et al. |

FOREIGN PATENT DOCUMENTS

| | | |
|---|---|---|
| CA | 2866749 A1 | 9/2013 |
| CN | 102866190 A | 1/2013 |
| JP | H06288962 A | 10/1994 |
| JP | 2001059835 A | 3/2001 |
| JP | 2003149193 A | 5/2003 |
| JP | 2003327579 A | 11/2003 |
| JP | 2005187369 A | 7/2005 |
| JP | 2008502921 A | 1/2008 |
| JP | 2011236258 A | 11/2011 |
| WO | 2014092543 A1 | 6/2014 |
| WO | 2015054546 A1 | 4/2015 |
| WO | 2016117663 A1 | 7/2016 |

OTHER PUBLICATIONS

Zhang et al., "Development of Magnesium-Ion-Selective Microelectrodes Based on a new Neutral Carrier ETHT 5504," Electroanalysis 1998, 10, No. 17 (Year: 1998).

Bühlmann et al., "Carrier-Based Ion-Selective Electrodes and Bulk Optodes. 2. Ionophores for Potentiometric and Optical Sensors", Chem. Rev. 1998, 98, 1593-1687 (Year: 1998).

International Search Report and Written Opinion of International Application No. PCT/US2016/015929 dated Apr. 22, 2016.

Oesch, et al., "Lifetime of Neutral Carrier Based Ion-Selective Liquid-Membrane Electrodes," 1980 Analytical Chemistry, 52 (4), pp. 692-700.

Dinten, et al., "Lifetime of Neutral-Carrier-Based Liquid Membranes in Aqueous Samples and Blood and the Lipophilicity of Membrane Components," 1991, Analytical Chemistry, 63 (6), pp. 596-603.

Eugster, et al., "Plasticizers for Liquid Polymeric Membranes of Ion-Selective Chemical Sensors," 1994, Analytica Chimica Acta, 289, pp. 1-13.

Wei Zhang, "Point of Care Testing of Ionized Magnesium in Blood with Potentiometric Sensors-Opportunities and Challenges," 2011, American Journal of Biomedical Sciences, 3(4), pp. 301-312.

Bühlmann et al., "Ion-Selective Electrodes with Ionophore-Doped Sensing Membranes," 2012, Supramolecular Chemistry: From Molecules to Nonomaterials, John Wiley & Sons, Ltd., pp. 2539-2579.

European Search Report and Written Opinion of European Application No. 16747054.1 dated Nov. 6, 2017.

Huser et al., "Membrane Technology and Dynamic Response of Ion-Selective Liquid-Membrane Electrodes," Jul. 1991 (Jul. 15, 1991), Analytical Chemistry; US; vol. 63; No. 14; 15; pp. 1380-1386.

Maj-Zurawska et al., "Determination of Magnesium and Calcium in Water with Ion-Selective Electrodes," Jan. 1, 1989; Analytica Chimica Acta, Elsevier Science Publishers B.V., Amsterdam, NL: vol. 218; pp. 47-59.

Spichiger et al., "Critical parameters and optimization of a magnesium-selective liquid membrane electrode for application to human blood serum," Jan. 1, 1991, Fresenius' Journal of Analytical Chemistry, vol. 341; No. 12, pp. 727-731.

Zhang et al., "An Impedance study of Mg2+-selective membranes," Mar. 1, 2000, Electrochimica Acta 45 pp. 2259-2266.

European Examination Report of European Application No. 16747054.1 dated Jan. 11, 2019.

Rouilly et al., "Neutral Ionophore-Based Selective Electrode for Assaying the Activity of Magnesium in Undiluted Blood Serum," 1990, Clin. Chem. 36/3; pp. 466-469.

O'Donnell et al..; "Development of Magnesium-Selective Ionophores," 1993, Analytica Chimica Acta, vol. 281, pp. 129-134.

Masadome et al., "Effect of Plasticizer on the Performance of the Surfactant-Selective Electrode Based on a Poly(Vinyl Chloride) Membrane with no Added Ion-Exchanger," received May 14, 2003; accepted Nov. 14, 2003; published online Feb. 13, 2004; Michrochimica Acta 144; pp. 217-220.

Zhang et al., "A Comparison of Neutral Mg2+-Selective Ionophores in Solvent Polymeric Membranes; Complex Stoichiometry and Lipophilicity," Jan. 2000, Analytical Sciences, vol. 16, pp. 11-18.

Siemens RAPIDPoint 500 Blood Gas Analyzers, 2012, pp. 1-4. (Year: 2012).

Watts et al., "Nitrate-selective electrode based on a cyclic bis-thiourea ionophore", Sensors and Actuators B 121, Nov. 9, 2006, pp. 200-207. (Year: 2006).

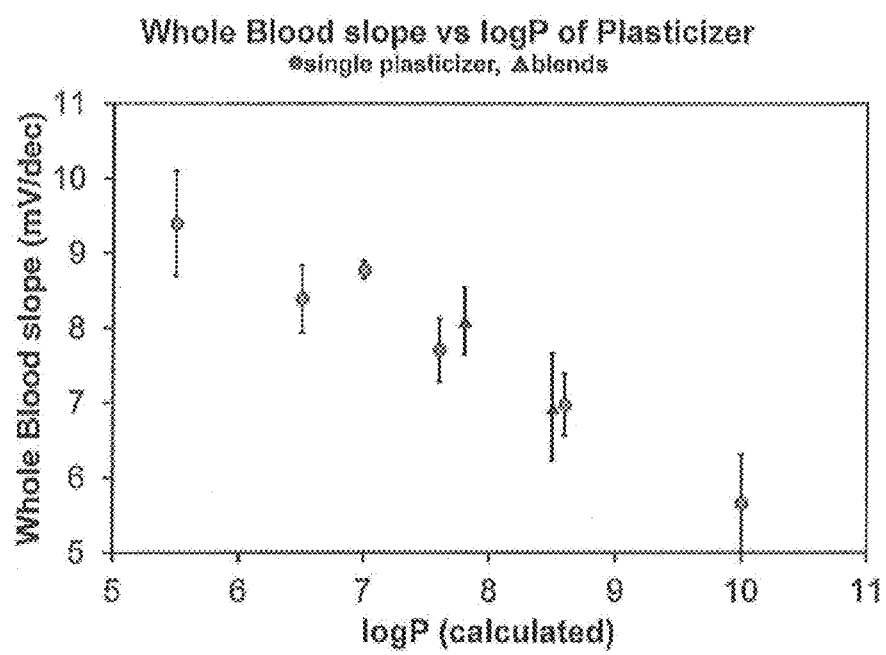

MAGNESIUM ION SELECTIVE MEMBRANES

CROSS REFERENCE TO RELATED APPLICATIONS/INCORPORATION BY REFERENCE STATEMENT

The subject application is a continuation of U.S. application Ser. No. 17/174,482, filed Feb. 12, 2021; which is a divisional of U.S. application Ser. No. 15/547,951, filed Aug. 1, 2017; which is a U.S. National Stage Application filed under 35 USC § 371 of International Application No. PCT/US2016/15929, filed Feb. 1, 2016; which claims benefit under 35 USC § 119(e) of U.S. Provisional Application No. 62/111,293, filed Feb. 3, 2015 and U.S. Provisional Application No. 62/239,492, filed Oct. 9, 2015. The entire contents of the above-referenced patent applications are hereby expressly incorporated herein by reference.

TECHNICAL FIELD

This disclosure relates generally to the field diagnostic testing, and more particularly to improved magnesium ($Mg^{2+}$) selective membranes for use in clinical applications. Sensors including the membranes exhibit both excellent selectivity for magnesium and a suitable use life in protein-based matrices such as whole blood.

BACKGROUND

Point-of-care testing refers generally to medical testing at or near the site of patient care such as in an emergency room. A desired outcome of such tests is to obtain rapid and accurate analytical results in order to determine a next course of action in patient care. Point of care or "critical care" analyzers provide analytical results for a number of different analytes in rapid succession. A number of these instruments employ a disposable cartridge having a plurality of different sensors disposed thereon, each for detecting a particular target analyte/property in a sample flowing thereover or thereby. The sensors may be suitable for the detection and/or determination of pH, carbon dioxide partial pressure ($pCO_2$), oxygen partial pressure ($pO_2$), sodium ($Na^+$), potassium ($K^+$), calcium ($Ca^{2+}$), chloride ($Cl^-$), hematocrit (Hct), hemoglobin (Hb), glucose, lactate, bilirubin, CO-oximeter fractions ($fO_2Hb$, $fCO_2Hb$, $fMetHb$, $fHHb$), and the like, for example.

While magnesium sensors, e.g., potentiometric ionized magnesium (iMg) sensors, are known, their use in clinical settings has been limited. For one, known magnesium sensors for clinical use have not been shown to be sufficiently selective for magnesium relative to other cations in protein-based matrices. Moreover, iMg sensors for clinical use must provide consistent performance over their use life without frequent (e.g., daily) replacement of the sensor panel. Leaching of material from the magnesium sensor, such as the plasticizer, will reduce shelf life, for example.

Another major source of this sensor instability and poor selectively is the thermodynamic binding kinetics of $Mg^{2+}$ over other cations afforded by the ionophore of the sensor and the relatively high aqueous desolvation energy of the magnesium cation. Although there are many ionophores available, most discriminate against calcium in the order of 10 to 1 even under ideal conditions. Under clinical diagnostic conditions, discrimination degrades even further as protein-based matrices provide further challenges and variables to magnesium detection. For example, discrimination may be on the order of 1:1 with known sensors, whereas the required discrimination for clinical settings is approximately 100:1. Zhang, W.; Am. J. Biomed. Sci. 2001, 3(4), 301-312. This need forces the use of chemometric techniques to correct the interference for other cations. Although chemometric techniques are helpful, such methods do not improve long term stability or sensitivity in protein-based matrices such as blood, which are critical for practical clinical use.

BRIEF DESCRIPTION OF THE DRAWINGS

FIG. 1 is a graph showing whole blood sensitivity of individual and blended membranes for $Mg^{2+}$ vs. calculated log P.

DETAILED DESCRIPTION

The present inventors have surprisingly found that the lipophilicity (log P) of the plasticizer (or blend of plasticizers) utilized in the formulation of a magnesium-selective membrane for clinical use with protein-based matrices is inversely proportional to the sensitivity of the membrane for magnesium in the protein-based matrices and directly proportional to the use life thereof. Sensitivity of magnesium in protein-based matrices is defined as the slope of the sensor output as a function of the ionized magnesium concentration, wherein the slope is a measure of a change in sensor voltage output versus a change in the log of ionized magnesium concentration. Prior attempts to improve magnesium ion selective membrane performance had suggested that the most lipophilic plasticizers available would offer both the best selectivity and therefore the best sensitivity for magnesium in protein-based matrices, as well as the longest use life. See Eugster, R., et al., *Plasticizers for liquid polymeric membranes of ion-selective chemical sensors*, Analytica Chimica Acta 289 (1994) 1-13. In contrast to conventional thought, however, the present inventors have found that increased log P values for the plasticizer(s) lead to magnesium ion selective membranes with reduced sensitivity to magnesium while improving use life thereof. Accordingly, the present inventors have found that optimum magnesium ion selective membrane performance for clinical use can be better understood and controlled by carefully selecting the plasticizer(s) to offer more of a balance between selectivity, sensitivity of magnesium in protein-based matrices, and use life based on its/their log P values.

In accordance with one aspect of the present invention, there is a provided a magnesium ion selective membrane comprising a mixture of a polymer material, a magnesium-selective material, and a plasticizer having a measured log P value of >5.8 and <12.8.

In accordance with another aspect of the present invention, there is provided a magnesium ion selective sensor including a magnesium ion selective membrane comprising a mixture of a polymer material, a magnesium-selective material, and a plasticizer having a measured log P value of >5.8 and <12.8.

In accordance with another aspect of the present invention, there is described a process for analyzing a protein-based sample for magnesium comprising providing a sensor comprising a mixture of a polymer, a magnesium-selective material, and a plasticizer, wherein the plasticizer comprises a measured log P value of >5.8 and <12.8. The method further includes introducing a protein-containing sample to the sensor. In an embodiment, the protein-based sample is whole blood.

As used herein, the term "about" refers to a value that is ±10% of the stated value.

As used herein, the term "log P" refers to a measure of a ratio of concentrations of a compound in a mixture of two immiscible phases (e.g., water and 1-octanol) at equilibrium.

As used herein, the term "subject" refers to any human and non-human mammal.

The performance of a magnesium ion selective membrane in terms of both its selectivity for $Mg^{2+}$ and its use life may be at least partially affected by the matrix to which it is exposed. Accordingly, the properties of the membrane in aqueous environments as reported by literature may be markedly different from the same membrane's performance with protein-containing matrices such as blood.

The various embodiments of a magnesium ion selective membrane as described herein may be incorporated into any suitable ion selective electrode and/or sensor as are well known in the art in any suitable form. In certain embodiments, the membrane may be applied as a layer in an assembly for detecting magnesium ions along with a polymer layer, an electrode layer, a conductor layer, and/or a transducer layer on a substrate. Exemplary structures into which the magnesium ion selective membrane may be incorporated are further set forth in U.S. Pat. Nos. 7,384,523; 6,767,450; and 5,102,527; U.S. Published Patent Application No. 20140158536; and WO2014092543 A1, for example.

The sample to be introduced to the membrane may be any sample suspected of having an amount of magnesium therein. In an embodiment, the sample comprises a biological fluid collected by any suitable method or device known in the art from a subject. Without limitation, the biological sample may comprise or may derived from any one of urine, whole blood, blood serum, blood plasma, saliva, cerebrospinal fluid, nasopharyngeal swabs, vaginal swabs, tears, tissues, and the like. The sample may further include any suitable buffers, diluents, or the like as are needed or desired for the particular type of sample.

In particular embodiments, the sample comprises a blood sample, which may be a whole blood sample comprising plasma and whole blood cells; a plasma sample; or a serum sample. When the sample is a whole blood sample, the whole blood sample may comprise white blood cells, red blood cells, platelets, and the like. In other embodiments, the blood sample comprises a plasma sample which has been treated to remove a plurality of the whole blood cells using known methods and devices such as centrifugation or commercially available porous membranes.

When provided, an electrode or electrode layer may comprise any suitable material known in the art. Without limitation, the electrode or electrode layer may comprise silver, silver/silver chloride, copper, titanium, chromium, gold, platinum, palladium, palladium/Silver, platinum black, platinum black/palladium, platinum oxide, iridium, iridium dioxide, and combinations thereof.

In an embodiment, the magnesium ion selective membrane comprises a polymer, one or more plasticizers (hereinafter "plasticizer"), and a magnesium selective material. The polymer may comprise any suitable inert and relatively stable material. Exemplary polymer materials for use in the membrane include a polyvinyl chloride (PVC), polystyrene, polyacrylate, polycarbonate, polyester, polyamide, polyurethane, or polyvinyl material, or co-polymers of the above.

In one aspect, the polymer and the plasticizer are mixed with the magnesium-selective material to provide the membrane with a selectivity for magnesium. The magnesium-selective material may comprise an ionophore, an ion exchange material, or a combination thereof. In an embodiment, the plasticizer is mixed with a polymer and an ionophore with functional groups for the selective binding with ionized magnesium in the sample. In another, embodiment, the magnesium-selective layer comprises mixture of the polymer, the plasticizer, and an ion exchanger added to the polymer and/or plasticizer to provide the necessary selectivity for magnesium. For example, the ion exchanger may be dissolved within or otherwise mixed with the plasticizer.

When present, the ionophore(s) for use with the membrane may comprise any suitable material. In an embodiment, the ionophore comprises a triamide compound such as those set forth below and in Philippe Bühlmann and Li D. Chen, Supramolecular Chemistry: From Molecules to Nanomaterials. Ion-Selective Electrodes With Ionophore-Doped Sensing Membranes, 2012 John Wiley & Sons, Ltd., the entirety of which is hereby incorporated by reference.

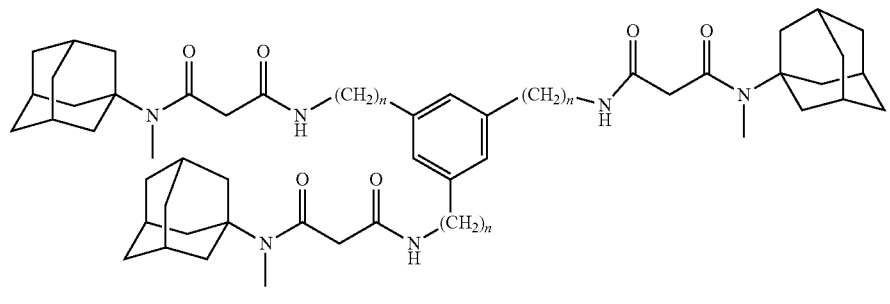

$Mg^{2+}$-I: n = 4
$Mg^{2+}$-II: n = 5

In still another embodiment, the ionophore may comprise the following compound as is set forth in Bühlmann, et al.:

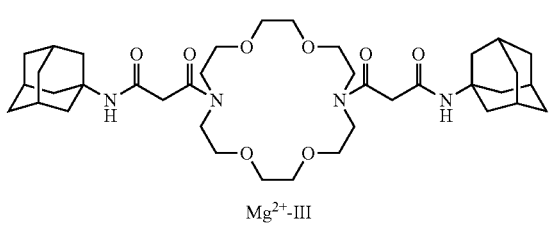

$Mg^{2+}$-III

When present, the ion exchange material may comprise any suitable material. In an embodiment, the ion exchange material comprises a lipophilic ion exchange salt as is known in the art. For example, in a particular embodiment, the ion exchange material comprises potassium tetrakis(4-chlorophenyl)borate.

The present inventors have surprisingly found that the log P of the plasticizer(s) used in the formulation of the magnesium ion selective membrane described have a much greater and different effect on use life and sensitivity for $Mg^{2+}$ in protein-based matrices than previously appreciated in the art. As previously mentioned, conventional wisdom would have led the skilled artisan to select plasticizers having higher log P values for both selectivity and use life in a magnesium sensor. However, the present inventors have found that the lipophilicity of the plasticizer used is actually inversely proportional to the sensitivity of the membranes described herein for protein-based samples. The inventors have also confirmed that the lipophilicity of the plasticizer is directly proportional to the use life of a sensor incorporating the membranes described herein. By "use life," in on embodiment, it is meant the ability of a sensor to provide reproducible results over a time period such as 28 days. In certain embodiments, the "use life" may be governed at least in part by the extent to which the plasticizer leaches from the sensor.

In view of the foregoing, selecting highly lipophilic plasticizers as taught by the literature may actually provide reduced sensitivity even though desirable use life is provided. Thus, an approach is necessitated that balances the need for high selectivity of the sensor for magnesium and sufficient use life for use in clinical applications. To the inventors' knowledge, the optimization of the log P value for an individual plasticizer or for a blend of plasticizers to balance the need for sufficient selectivity, sensitivity in protein matracies, and use life in clinical settings has not been recognized to date as critical since the relationship between log P values, selectivity, sensitivity, and use life had not been fully realized for protein-containing matrices.

In an embodiment, the plasticizer comprises a measured log P value of from about to about 12.8, and in particular embodiments from about 7.0 to about 9.0, and in a specific embodiment about 8.0. A plasticizer having a measured log P value of greater than 12.8 will provide a sensor 10 with a magnesium sensitivity generally insufficient for clinical use. On the other hand, if the plasticizer has a measured log P below 5.8, the sensitivity of the layer 16 for magnesium in a blood sample (e.g., whole blood) may be sufficient for clinical use, but use life is compromised and may be unsuitable for multi-day use of the sensor.

The plasticizer may comprise any one or more commercially available or synthesized plasticizers in an amount effective to provide a membrane having the desired log P (measured log P of about 5.8 to about 12.8). In one aspect, the plasticizer comprises one or more commercially available plasticizers. Exemplary commercially available plasticizers include but are not limited to nitro-phenyl octyl ether (NPOE) or any suitable compound referred to by an ETH number as is known in the art, such as ETH 217 (1-dodecyloxy-2-nitrobenzene). Other exemplary ETH compounds include but are not limited to ETH 220, 264, 2041, 2480, 2481, 2485, 3832, 4190, 4302, 4305, 4306, 4314, 4315, 4332, 4354, 4358, 5367, 5372, 5373, 5382, 5389, 5392, 5401, 5406, 5504, 5506, 7025, 7132, 8028, 8030, 8031, 8032, 8033, 8034, 8035, 8036, 8037, 8045, 8050, 8053, 8055, 8057, 8059, 8063, 8064, 8065, and combinations thereof. A number of these exemplary plasticizers, further plasticizers, and the preparation thereof are described in Eugster, R., Analytica Chimica Acta 289 (1994) 1-13 and Zhang, W., Am. J. Biomed. Sci. 2011, 3 (4), 301-312, the entirety of each of which are hereby incorporated by reference.

In accordance with another aspect of the present invention, the selected plasticizer may be synthesized to have the desired log P value for use in the magnesium ion selective membrane. Thus, the plasticizer may comprise or further comprise (blended with a commercially available plasticizer) a synthesized plasticizer, which may not be commercially available. In an embodiment, the synthesized plasticizer comprises a nitrophenyl group and a hydrophobic chain extending therefrom such as an alkyl ether or phenyl ether. In a particular embodiment, the plasticizer comprises a compound as follows:

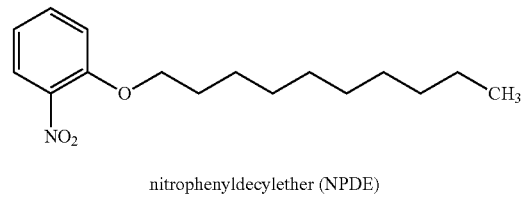

nitrophenyldecylether (NPDE)

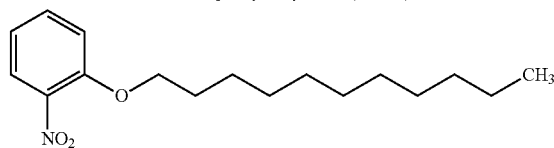

(nitrophenylundecylether (NPUDE)

In certain embodiments, the plasticizer may be synthesized according to one or methods set forth in Eugster, R., Analytica Chimica Acta 289 (1994) 1-13 and Zhang, W., Am. J. Biomed. Sci. 2011, 3 (4), 301-312.

The measurement of the log P values for any plasticizer (individual plasticizer or blend) may take place according to known methods in the art such as by thin layer chromatography (TLC). An exemplary measurement process is set forth in each of U. Oesch, and W. Simon, Anal. Chem., 52 (1980) 692 and O. Dinten, U. E., et al. Anal. Chem., 63 (1991) 596, the entirety of each of which is hereby incorporated by reference herein. Alternatively, the log P for any individual plasticizer or blend of plasticizers may be calculated by known methods in the art such as software available from Advanced Chemistry Development, Inc. (ACD) for this purpose.

In accordance with another embodiment, without first making the blend, obtaining the individual plasticizer, and/or making the sensor, the log P of the plasticizer(s) may be calculated from known literature sources to provide a projected performance profile for the associated membrane and sensor. In an embodiment, the one or more plasticizers comprise a calculated log P value of from about 5.0 to about 13.0, and in particular embodiments from about 5.0 to about 10.0; from about 7.0 to about 9.0; or about 8.0.

In one embodiment, when the plasticizer comprises a blend of two or more materials, the log P value for a blend of plasticizers may be determined from a summation of fractional log P data according to the following formula (I):

$$\log P = (\log P_1 * X_1) + (\log P_2 * X_2) \text{ where } X = \text{fraction of the plasticizer by weight} \tag{I}$$

It is appreciated that additional plasticizers could be added to the formula, e.g., (log $P_3*X_3$), (log $P_4*X_4$), etc.

The values utilized in the formula may be a measured log P value or one obtained or calculated from literature or from suitable software as described herein.

By way of example, in a particular embodiment, the plasticizer may comprise a blend of ETH 8045 and NPOE in a ratio of 50:50 to 66:34. ETH 8045 has a calculated log P value of 10 while NPOE has a calculated log P value of 5.5. As shown below in formulas (II) and (III) below, this provides a fractional (blended) sum log P value of:

$$\log P = (10*0.5)+(5.5*0.5)=7.75 \text{ for a 50:50 blend of ETH 8045/NPOE} \quad (II)$$

$$\log P = (10*0.66)+(5.5*0.34)=8.47 \text{ for a 66:34 blend of ETH 8045/NPOE} \quad (III)$$

Accordingly, blends may provide log P values between those obtainable by various plasticizers individually. Blends may also provide log P values which effectively provide a balance between use life and sensitivity of the membrane for magnesium. It is appreciated that actual measured log P values may differ from those calculated from literature due to measurement and calculation methods.

A magnesium selective sensor comprising a magnesium ion selective membrane as described herein may be incorporated within a cartridge employing a plurality of additional sensors for the detection of one or more additional analytes as is known in the art. The additional sensors may be suitable for the detection of one or more of pH, carbon dioxide partial pressure ($pCO_2$), oxygen partial pressure ($pO_2$), sodium ($Na^+$), potassium ($K^+$), calcium ($Ca^{2+}$), chloride ($Cl^-$), hematocrit (Hct), hemoglobin (Hb), glucose, lactate, bilirubin, CO-oximeter fractions ($fO_2Hb$, $fCO_2Hb$, $fMetHb$, $fHHb$), and the like, for example.

In addition, the sensors described herein may be incorporated within such cartridges and utilized within a point of care instrument as is known in the art. Exemplary point of care instruments, e.g., blood gas analyzers, are available from Siemens Healthcare Diagnostics, Inc. and are currently sold under the trademarks: RAPIDLab 1200, RapidLab 348EX, RAPIDPoint 500, RAPIDLab 248/348, RAPID-Point 400/405, and RAPIDPoint 340/350 Systems.

The sensors described herein are beneficial in the clinical determination of magnesium ion concentration in protein-based matrices such as whole blood. Abnormal magnesium concentrations have been associated with renal disease, hypertension, preeclampsia, diabetes mellitus, amongst other conditions. See Zhang, W., Am. J. Biomed. Sci. 2011, 3(4), 301-312. Thus, the devices, systems, and processes herein may advantageously improve the identification and treatment of these conditions.

In accordance with an aspect of the invention, there is described a process for analyzing a protein-based sample for a presence of magnesium in the sample. The method comprises contacting a protein-containing sample with a magnesium-selective membrane as described herein. In an embodiment, the magnesium ion selective membrane comprises a mixture of a polymer, a magnesium-selective material, and a plasticizer comprising a measured log P value of >5.8 and <12.8. The method may further comprise determining a presence of magnesium in the sample after the contacting.

The determining may be done qualitatively, semi-quantitatively, or quantitatively through the use of known standards and controls as would be well understood by persons skilled in the art. For example, results may be compared to values of a calibration curve created from a plurality of standard samples having predetermined concentrations as is well-known in the art. The determined values may be compared to predetermined threshold values such as medical decision levels as described above.

To accomplish these objectives, the sensors may be part of a system and the system may comprise a computing unit comprising one or more modules configured to receive data from the sensor incorporating the membrane (and additional sensors if provided) and determine at least one result from the data. The computing unit may comprise, for example, a special purpose computer comprising a microprocessor, a microcomputer, an industrial controller, a programmable logic controller, a discrete logic circuit or other suitable controlling device. In an embodiment, the computing unit may further comprise one or more input channels, a memory, and output channel(s). The memory may include a computer-readable medium or a storage device, e.g., floppy disk, a compact disc read only memory (CD-ROM), or the like. In an embodiment, the computing unit may comprise computer readable instructions for performing any aspect of the methods or for controlling any aspect of the components described herein.

Examples are provided herein below. However, it is understood that the description herein is not to be limited in its application to the specific experimentation, results, and laboratory procedures. Rather, the Examples are simply provided as one of various embodiments and are meant to be exemplary, not exhaustive.

EXAMPLES

Example 1: Correlation of Whole Blood Sensitivity to Plasticizer

A plurality of sensors having the blended plasticizers were made as follows: Membrane formulations were prepared by using a range of plasticizers, polyvinylchloride, magnesium ionophores, and lipophilic ion exchange salts. The materials were dissolved in a suitable organic solvent at a solids ratio of 10%. The solutions were deposited on the sensor substrates and the solvent allowed to evaporate yielding the formed membranes. The formulations were optimized to yield membranes with the best obtainable magnesium selectivity over calcium and were generally at least greater than 1:1. Formulations either had a single plasticizer or a blend of two plasticizers to yield membranes with intermediate calculated log P.

Table 1 presents the plasticsizers tested, literature selectivity (log K), calculated log P and their corresponding magnesium blood sensitivity slopes (mV/dec). This data is plotted in FIG. 1.

TABLE 1

| Plasticizer | Structure | Selectivity $\log K^{Pot}_{MgCa}$ | logP | Blood sensitivity (mV/dec) |
|---|---|---|---|---|
| NPOE | 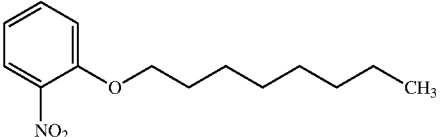 | −1.0 | 5.5 | 9.4 |
| NPDE | 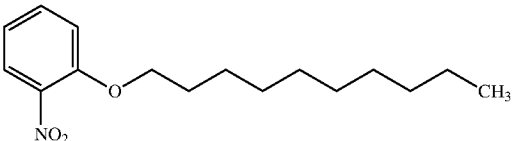 |  | 6.5 | 8.4 |
| NPUDE | 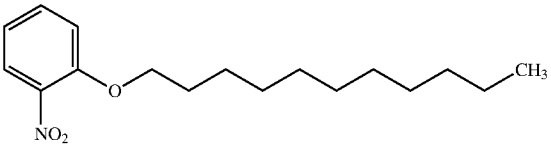 [SMILES: CCCCCCCCCCCOc1ccccc1[N+](=O)[O-]] |  | 7.0 | 8.8 |
| ETH 217 | 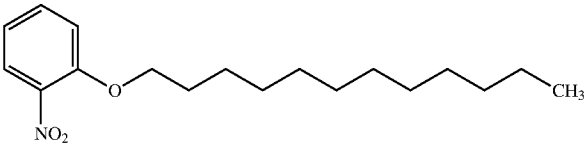 [SMILES: CCCCCCCCCCCCOc1ccccc1[N+](=O)[O-]] | −1.1 | 7.6 | 7.7 |
| NPTDE | 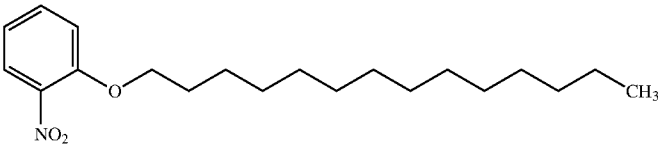 [SMILES: CCCCCCCCCCCCCCOc1ccccc1[N+](=O)[O-]] |  | 8.6 | 7.0 |
| ETH 8045 | 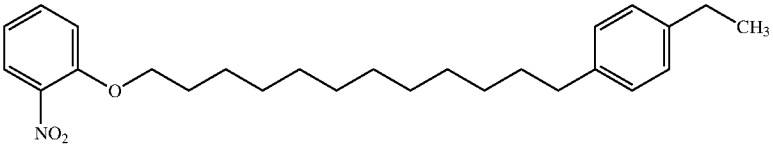 [SMILES: CCc1ccc(CCCCCCCCCCCCOc2ccccc2[N+](=O)[O-])cc1] | −1.3 | 10 | 5.7 |

FIG. 1 is a graph showing whole blood slope (mV/dec) for $Mg^{2+}$ for the plurality of sensors formulated with single plasticizers and blended plasticizers vs. log P or the fractional sum log P of the blend, respectively. As presented in FIG. 1, the results surprisingly show that as the log P increases, there is a corresponding decrease in the sensitivity to magnesium even though in a contradictory fashion the selectivity increases with log P. The lower the sensitivity the more error and the less precise the measurements become. For those skilled in the art of clinical and analytical diagnostics it will be appreciated that it is critical to have the highest sensitivity possible to yield the best results for patients. By blending plasticizers in membranes, intermediate log P values can be achieved which also exhibit the same behavior as membranes formulated with single plasticizers.

Example 2

Membrane formulations were prepared by using NPOE or ETH 217 plasticizers with polyvinylchloride, magnesium ionophore and lipohilic ion exchange salt. The materials were dissolved in a suitable organic solvent at a solids ratio of 10%. The solutions were deposited on the sensor substrates and the solvent allowed to evaporate yielding the formed membranes. The formulations were optimized to yield membranes with the best obtainable magnesium selectivity over calcium and were generally at least greater than 1:1.

Sensors were incorporated into RAPIDPoint systems (available from Siemens Healthcare Diagnostics Inc.) and tested over at least 25 days. During this time, sensors were calibrated with magnesium containing reagents and exposed to whole blood samples at approximately 10 per business day. In addition, magnesium containing quality control solutions were also run across least 25 days at least once every day. After testing the membranes were removed from the sensor substrate and the amount of remaining plasticizer was determined by UPLC and so the amount of plasticizer lost over time was calculated. Table 2 presents the amount of plasticizer lost over time and shows that membranes formulated with NPOE lose greater than 50% of its content.

TABLE 2

| Plasticizer | % by wt Plasticizer Lost |
|---|---|
| NPOE | 59% |
| ETH 217 | 3.9% |

The loss of plasticizer negativily impacts sensor performance. This can be measured by many ways, for example with precision of quality control solutions over use life. Table 3 presents the average of the total % coefficient of variation (CV) of a 0.7 mM magnesium quality control solution over at least 25 days of testing. It can be seen that sensors formulated with the more extractable NPOE exhibit much higher CV and therefore are clinically and analytically inferior to sensors formulated with a plasticizer possessing a higher log P.

TABLE 3

| Plasticizer | % CV |
|---|---|
| NPOE | 10% |
| ETH 217 | 5% |

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The following is a non-limiting list of illustrative embodiments of the inventive concepts disclosed above:

1. A magnesium ion selective membrane comprising: a polymer material; a magnesium-selective material; and a plasticizer comprising a measured log P value of >about 5.8 and <about 12.8. It should be understood that the symbol '>' refers to the concept of "greater than" and the symbol '<' refers to the concept of "less than."
2. The membrane of illustrative embodiment 1, wherein the polymer material comprises a member selected from the group consisting of polyvinyl chloride, polystyrene, polyacrylate, polycarbonate, polyester, polyamide, polyurethane, polyvinyl material, vinyl acetates, and co-polymers of any of the above.
3. The membrane in any one of illustrative embodiments 1 to 2, wherein the plasticizer comprises a blend of two or more plasticizers.
4. The membrane of illustrative embodiment 3, wherein the blend of plasticizers comprises a blend of ETH 8045 and nitro-phenyl octyl ether (NPOE).
5. The membrane illustrative embodiment 4, wherein a ratio of ETH 8045 to NPOE is from about 50:50 to about 66:34.
6. The membrane in any one of illustrative embodiments 1 to 5, wherein the plasticizer comprises a measured log P value of about 7 to about 9.
7. The membrane of illustrative embodiment 6, wherein the plasticizer comprises a measured log P value of about 8.
8. The membrane in any one of illustrative embodiments 1 to 7, wherein the magnesium-selective material comprises a member from the group consisting of one or more ionophores, one or more ion exchange materials, and a combination thereof.
9. The membrane of any one of illustrative embodiments 1 to 8, wherein the magnesium-selective material comprises an ion exchange material.
10. The membrane of illustrative embodiment 9, wherein the ion exchange material comprises a lipophilic ion exchange salt.
11. The membrane of illustrative embodiment 9, wherein the ion exchange material comprises potassium tetrakis (4-chlorophenyl)borate.
12. The membrane in any one of illustrative embodiments 1 to 8, wherein the magnesium-selective material comprises an ionophore.
13. The membrane of illustrative embodiment 12, wherein the ionophore comprises a triamide compound.
14. The membrane of any one of illustrative embodiments 1 to 13, further comprising an organic solvent.
15. A magnesium ion selective electrode comprising the membrane in any one of illustrative embodiments 1 to 14.
16. A magnesium ion selective sensor comprising a membrane in any one of illustrative embodiments 1 to 14.
17. An array of sensors comprising: the sensor of any one of claim 15 or 16 for determining an amount of magnesium in a protein-containing sample; and at least one additional sensor for determining an amount of additional target analyte in the protein-containing sample.
18. The array of illustrative embodiment 17, wherein the at least one additional sensor is configured for analysis of a member selected from the group consisting of pH, carbon dioxide partial pressure, oxygen partial pressure, sodium, potassium, calcium, chloride, hematocrit, hemoglobin, glucose, lactate, bilirubin, and CO-oximeter fractions.
19. A point of care analyzer comprising the sensor of illustrative embodiment 16.
20. A point of care analyzer comprising the array of illustrative embodiment 17.
21. A magnesium ion selective membrane comprising: a polymer material; a magnesium-selective material; and a plasticizer comprising a log P value greater than that of NPOE but less than that of ETH 8045.
22. The membrane of illustrative embodiment 21, wherein the polymer material comprises a member selected from the group consisting of polyvinyl chloride, polystyrene, polyacrylate, polycarbonate, polyester, polyamide, polyurethane, polyvinyl material, vinyl acetates, and co-polymers of any of the above.
23. The membrane of any one of illustrative embodiments 21 or 22, wherein the plasticizer comprises a blend of two or more plasticizers.
24. The membrane of illustrative embodiment 21, wherein the blend of plasticizers comprises a blend of ETH 8045 and nitro-phenyl octyl ether (NPOE).
25. The membrane of illustrative embodiment 24, wherein a ratio of ETH 8045 to NPOE is from about 50:50 to about 66:34.
26. The membrane in any one of illustrative embodiments 21 to 25, wherein the plasticizer comprises a calculated log P value of about 5.0 to about 13.0.
27. The membrane in any one of illustrative embodiments 21 to 25, wherein the plasticizer comprises a measured log P value of >about 5.8 and <about 12.8.
28. The membrane of illustrative embodiment 27, wherein the plasticizer comprises a measured log P value of from about 7 to about 9.

29. The sensor in any one of illustrative embodiments 27 to 28, wherein the measured log P value is determined by thin layer chromatography.
30. The membrane in any one of illustrative embodiments 21 to 29, wherein the magnesium-selective material comprises a member from the group consisting of one or ionophores, one or more ion exchange materials, and a combination thereof.
31. The membrane of illustrative embodiment 30, wherein the magnesium-selective material comprises an ion exchange material.
32. The membrane of illustrative embodiment 31, wherein the ion exchange material comprises a lipophilic ion exchange salt.
33. The membrane of illustrative embodiment 31, wherein the ion exchange material comprises potassium tetrakis (4-chlorophenyl)borate.
34. The membrane of illustrative embodiment 30, wherein the magnesium-selective material comprises an ionophore.
35. The membrane of illustrative embodiment 34, wherein the ionophore comprises a triamide compound.
36. The membrane of any one of illustrative embodiments 21 to 35, further comprising an organic solvent.
37. A magnesium ion selective electrode comprising a membrane in any one of illustrative embodiments 21 to 36.
38. A magnesium ion selective sensor comprising a membrane in any one of illustrative embodiments 21 to 36.
39. An array of sensors comprising: the sensor of illustrative embodiment 38 for determining an amount of magnesium in a protein-containing sample; and at least one additional sensor for determining an amount of additional target analyte in the protein-containing sample.
40. The array of illustrative embodiment 39, wherein the at least one additional sensor is configured for analysis of a member selected from the group consisting of pH, carbon dioxide partial pressure, oxygen partial pressure, sodium, potassium, calcium, chloride, hematocrit, hemoglobin, glucose, lactate, bilirubin, and CO-oximeter fractions.
41. A point of care analyzer comprising the sensor of illustrative embodiment 38.
42. A point of care analyzer comprising the array of illustrative embodiment 39.
43. A process for analyzing a protein-based sample for magnesium comprising: to a sensor including a magnesium ion selective membrane that comprises: a polymer material; a magnesium-selective material; and a plasticizer comprising a measured log P value of >5.8 and <12.8, introducing a protein-containing sample with the sensor; and determining a presence of magnesium in the sample after the contacting.
44. The process of illustrative embodiment 43, wherein the protein-containing sample comprises whole blood.
45. The process in any one of illustrative embodiments 43 to 44, wherein the polymer material comprises a member selected from the group consisting of polyvinyl chloride, polystyrene, polyacrylate, polycarbonate, polyester, polyamide, polyurethane, polyvinyl material, vinyl acetates, and co-polymers of any of the above.
46. The process of any one of illustrative embodiments 43 to 45, wherein the plasticizer comprises a blend of two or more plasticizers.
47. The process of illustrative embodiment 46, wherein the blend of plasticizers comprises a blend of ETH 8045 and nitro-phenyl octyl ether (NPOE).
48. The process of illustrative embodiment 47, wherein a ratio of ETH 8045 to NPOE is from about 50:50 to about 66:34.
49. The process of any one of illustrative embodiments 43 to 38, wherein the plasticizer comprises a measured log P value of from about 7 to about 9.
50. The process in any one of illustrative embodiments 43 to 49, further comprising: further comprising providing one or more additional sensors for detection of a presence of an additional analyte or property in the sample selected from the group consisting of pH, carbon dioxide partial pressure, oxygen partial pressure, sodium, potassium, calcium, chloride, hematocrit, hemoglobin, glucose, lactate, bilirubin, and CO-oximeter fractions; and detecting the presence of the additional analyte or property in the sample.
50. A process for analyzing a protein-based sample for magnesium comprising: contacting a protein-containing sample with a sensor comprising a membrane as set forth in any one of illustrative embodiments 1-14 and 21-36; and determining a presence of magnesium in the sample after the contacting.
51. The process of illustrative embodiment 50, wherein the protein-containing sample comprises whole blood.
52. The process in any one of illustrative embodiments 50 to 51, further comprising: providing one or more additional sensors for detection of a presence of an additional analyte or property in the sample selected from the group consisting of pH, carbon dioxide partial pressure, oxygen partial pressure, sodium, potassium, calcium, chloride, hematocrit, hemoglobin, glucose, lactate, bilirubin, and CO-oximeter fractions; and detecting the presence of the additional analyte or property in the sample.

What is claimed is:
1. A magnesium ion selective membrane that has magnesium selectivity over calcium, the magnesium ion selective membrane comprising:
a polymer material;
a magnesium-selective material comprising a single ionophore, wherein the ionophore comprises a triamide compound; and
a blend of two or more plasticizers, wherein at least one plasticizer comprises a measured log P value of greater than about 5.8 and less than about 12.8, wherein each plasticizer comprises a nitrophenyl group and hydrophobic chain extending therefrom with a structure of:

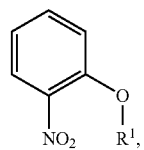

wherein $R^1$ comprises a straight-chain alkyl group having 10 to 14 carbons or comprises a 12-(4-ethylphenyl)-dodecyl group.
2. The magnesium ion selective membrane of claim 1, wherein the polymer material comprises a member selected from the group consisting of polyvinyl chloride, polystyrene, polyacrylate, polycarbonate, polyester, polyamide, polyurethane, polyvinyl material, vinyl acetates, and co-polymers of any of the above.

3. The magnesium ion selective membrane of claim 1, wherein the magnesium-selective material comprises an ion exchange material.

4. The magnesium ion selective membrane of claim 3, wherein the ion exchange material comprises potassium tetrakis(4-chlorophenyl)borate.

5. The magnesium ion selective membrane of claim 1, wherein the $R^1$ in the structure of at least one of the plasticizers is a 12-(4-ethyl-phenyl)-dodecyl group.

6. The magnesium ion selective membrane of claim 1, wherein at least one of the plasticizers comprises a measured log P value of about 8.

7. The magnesium ion selective membrane of claim 1, wherein the blend of plasticizers comprises a blend of ETH 8045 and nitro-phenyl octyl ether (NPOE).

8. The magnesium ion selective membrane of claim 7, wherein a weight ratio of ETH 8045 to NPOE is in a range of from about 50:50 to about 66:34.

9. A potentiometric magnesium ion selective sensor configured for determining magnesium ion concentration in biological samples using an automated point-of-care analyzer, the sensor comprising:
the magnesium ion selective membrane of claim 1; and
a substrate upon which the magnesium ion selective membrane and at least one additional layer are applied, wherein the at least one additional layer is selected from the group consisting of a polymer layer, an electrode layer, a conductor layer, a transducer layer, and combinations thereof.

10. The potentiometric magnesium ion selective sensor of claim 9, wherein the sensor has a clinical use life of at least 25 days.

11. A multi-use cartridge configured for disposal in an automated point-of-care analyzer, the multi-use cartridge comprising the potentiometric magnesium ion selective sensor of claim 9 incorporated therewithin.

12. A magnesium ion selective membrane that has magnesium selectivity over calcium, the magnesium ion selective membrane comprising:
a polymer material;
a magnesium-selective material comprising a single ionophore, wherein the ionophore comprises a triamide compound; and
a plasticizer comprising a measured log P value of about 8, wherein the plasticizer comprises a nitrophenyl group and hydrophobic chain extending therefrom with a structure of:

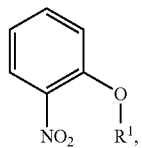

wherein $R^1$ comprises a straight-chain alkyl group having 10 to 14 carbons or comprises a 12-(4-ethyl-phenyl)-dodecyl group.

13. The magnesium ion selective membrane of claim 12, wherein the polymer material comprises a member selected from the group consisting of polyvinyl chloride, polystyrene, polyacrylate, polycarbonate, polyester, polyamide, polyurethane, polyvinyl material, vinyl acetates, and co-polymers of any of the above.

14. The magnesium ion selective membrane of claim 12, wherein the $R^1$ in the structure of the plasticizer comprises a straight-chain alkyl group having 12 carbons.

15. The magnesium ion selective membrane of claim 12, wherein the $R^1$ in the structure of the plasticizer is a 12-(4-ethyl-phenyl)-dodecyl group.

16. The magnesium ion selective membrane of claim 12, wherein the magnesium-selective material comprises an ion exchange material, and wherein the ion exchange material comprises potassium tetrakis(4-chlorophenyl)borate.

17. A potentiometric magnesium ion selective sensor configured for determining magnesium ion concentration in biological samples using an automated point-of-care analyzer, comprising:
the magnesium ion selective membrane of claim 12; and
a substrate upon which the magnesium ion selective membrane and at least one additional layer are applied, wherein the at least one additional layer is selected from the group consisting of a polymer layer, an electrode layer, a conductor layer, a transducer layer, and combinations thereof.

18. The potentiometric magnesium ion selective sensor of claim 17, wherein the sensor has a clinical use life of at least 25 days.

19. A multi-use cartridge configured for disposal in an automated point-of-care analyzer, the multi-use cartridge comprising the potentiometric magnesium ion selective sensor of claim 17 incorporated therewithin.

* * * * *